United States Patent [19]

Dehney et al.

[11] 4,326,175
[45] Apr. 20, 1982

[54] MULTI-COLOR, MULTI-PULSE LASER SYSTEM

[75] Inventors: George J. Dehney, Westford, Mass.; Gerald L. Spade, Nashua, N.H.

[73] Assignee: Sanders Associates, Inc., Nashua, N.H.

[21] Appl. No.: 746,989

[22] Filed: Dec. 2, 1976

[51] Int. Cl.³ ........................... H01S 3/05; H01S 3/10
[52] U.S. Cl. ...................... 372/106; 330/4.3; 371/10
[58] Field of Search ............... 331/94.5 C, 94.5 M, 331/94.5 Q; 330/4.3; 332/7.51

[56] References Cited

U.S. PATENT DOCUMENTS

| | | | |
|---|---|---|---|
| 3,482,184 | 12/1969 | Schneider et al. | 331/94.5 C |
| 3,492,600 | 1/1970 | Zitter | 332/7.51 |
| 3,564,454 | 2/1971 | Hook et al. | 332/7.51 |
| 3,766,393 | 10/1973 | Harzog et al. | 331/94.5 C |
| 3,857,109 | 12/1974 | Pilloff | 331/94.5 C |

Primary Examiner—Nelson Moskowitz
Attorney, Agent, or Firm—Louis Etlinger; Richard I. Seligman

[57] ABSTRACT

A laser system for generating two closely spaced in time laser pulses where each pulse is a different color comprises a first and second optical cavity with a common optical leg containing a laser rod capable of emitting light of two polarities along an axis and a polarizing beam-splitter positioned at the common junction of the two cavities for splitting the radiation impinging thereon according to polarity and propagating it into the noncommon sections of the first and second optical cavities each of which contains a Q-switch. The output from the cavities is taken at the polarizing beam-splitter and comprises two closely spaced in time pulses of different polarity. The two pulses are applied to a doubler crystal such that pulses of one polarity are doubled while pulses of the other polarity are unchanged.

8 Claims, 1 Drawing Figure

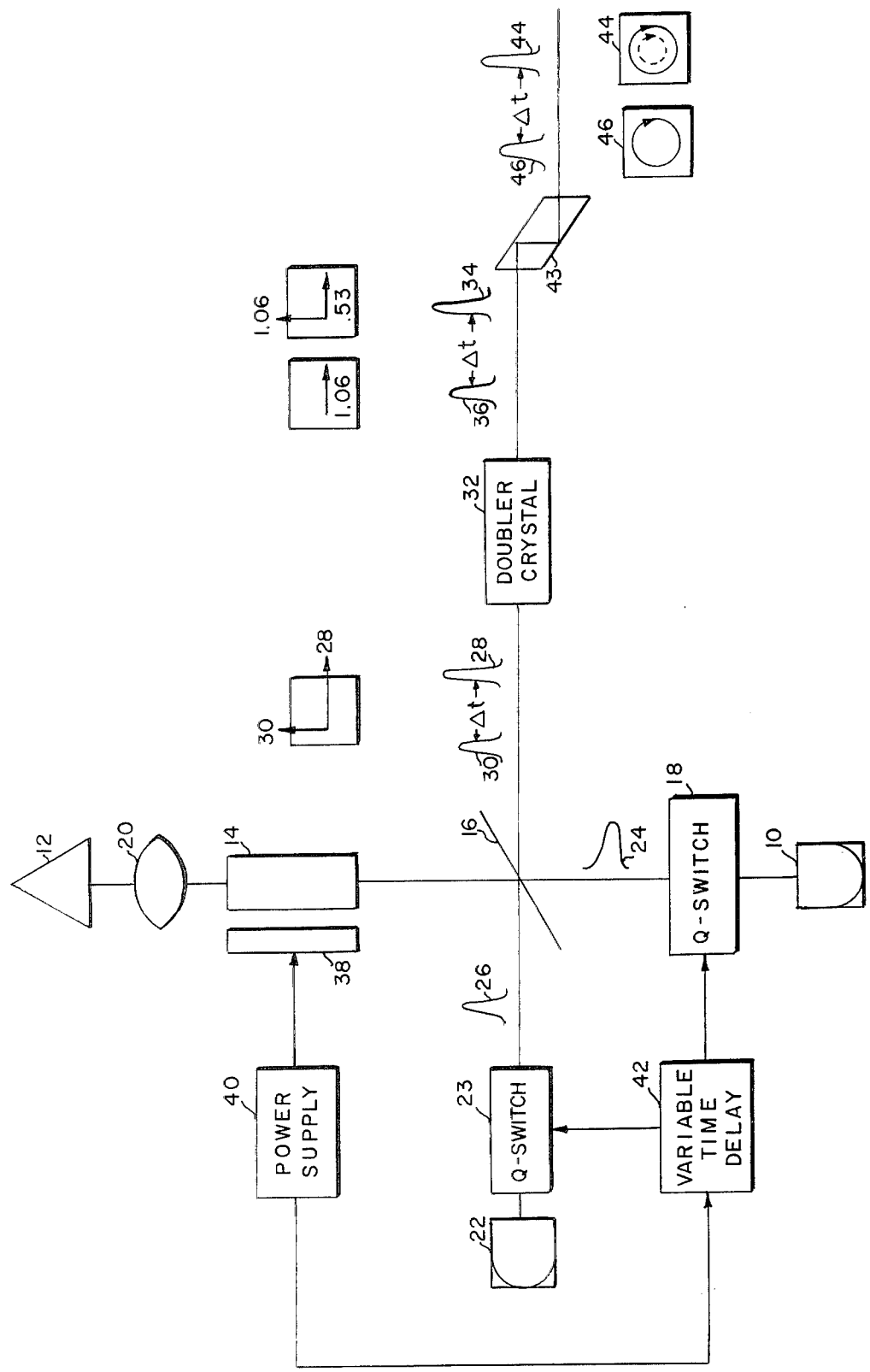

MULTI-COLOR, MULTI-PULSE LASER SYSTEM

BACKGROUND OF THE INVENTION

This invention relates to Q-switched lasers and more particularly to means for producing multiple laser pulses of different wavelengths from a single laser rod.

A variety of systems require the generation of two or more rapidly recurring laser pulses of substantially the same amplitude over a variable pulse interval wherein each of the pulses is of a different wave-length. U.S. Patent application Ser. No. 591,382 filed on June 23, 1975 for "Multiple Pulse Laser" discloses a laser for generating laser pulse doublets from a single laser rod at high efficiencies by temporally isolating the different light polarities from a single, thermally induced, stress-birefringent laser rod into two independent laser cavities which are independently Q-switched. However, this laser only produces pulses of the same wavelength.

In order to obtain multiple laser pulses of different wavelengths the system set forth in U.S. Patent application Ser. No. 559,295 filed on Mar. 17, 1975 for a "Multi-Color, Multi-Pulse Laser" was proposed. This laser system employs two cavities having a common optical leg each of which is tuned to a different transition of the laser medium such that when the laser emits at two different wavelengths each cavity will generate laser pulses at the respective wavelengths. This laser requires great care in the critical selection of a laser material which must generate substantial amounts of energy at different wavelengths.

SUMMARY OF THE INVENTION

Accordingly, it is an object of this invention to provide an improved laser.

It is another object of this invention to provide an improved laser which emits multiple pulses of different wavelengths simply and efficiently.

Briefly, the present invention provides means for generating laser pulse doublets at different wavelengths from a single laser rod at extremely high efficiencies. This is accomplished by isolating the different radiation polarities from a single thermally induced, stress-birefringent laser rod into two laser cavities where they are independently Q-switched to generate two pulses of radiation at different polarities. The two pulses of radiation are applied to a doubler crystal which is substantially responsive to one polarization so as to double the frequency of that pulse while substantially unresponsive to the other polarization to pass it substantially unchanged.

BRIEF DESCRIPTION OF THE DRAWINGS

The above-mentioned and other features and objects of this invention will become more apparent by reference to the following description taken in conjunction with the accompanying drawing which is a block diagram of a two color doublet pulse laser.

DESCRIPTION OF PREFERRED EMBODIMENT

Referring now to FIG. 1 of the drawings, there is illustrated thereby an embodiment of the invention comprising a double cavity laser system. The first optical cavity is defined at the ends by a pair of crossed Porro prisms 10 and 12 and positioned within and along its optical axis is a lasing means 14, a polarizer/beam-splitter 16, Q-switching means 18 and beam shaping optics 20, as, for example, a compensating telescope.

The second optical cavity is defined at its ends by crossed Porro prisms 22 and 12 and positioned within and along its optical axis is polarizer/beam-splitter 16, laser means 14, beam shaping optics 20 and a Q-switching means 23. It can be seen that the leg containing the lasing means 14, the Porro prism 12, the beam shaping optics 20 and the polarizer/beam-splitter 16 is common to both optical cavities.

Referring more specifically to the lasing means 14 contained within this common leg, a variety of lasing devices and lasing materials may be utilized to implement the lasing means 14. The only restriction made on the lasing device used is that it exhibit thermally induced stress-birefringence. This requirement is made in order to insure the light of two different polarities is generated by the lasing means 14. In this embodiment of the invention the lasing means 14 comprises a Nd:YAG laser rod. However, any birefringent host materials such as $Al_2O_3$, $Cr^3$ doped (ruby) can be used.

Although crossed Porro prisms are illustrated as a preferred resonating means, clearly, highly reflective mirrors could be substituted therefor. However, crossed Porro prisms do eliminate much of the misalignment problems occasioned by the use of high reflectivity mirrors.

The polarizer/beam-splitter 16 is positioned at one end of the lasing means 14 and along its light emitting axis. The polarizer operates to split the light emissions from the laser means according to their two component light polarities and to propagate the light of one polarity 24 into the noncommon section of the first optical cavity so that it impinges on the Porro prism 10 while propagating light of the second polarity 26 into the noncommon section of the second optical cavity so that it impinges on the Porro prism 22.

The output from the polarizer/beam-splitter comprising pulses 28 and 30 are applied to a doubler crystal 32 with the output therfrom comprising two pulses separated in time and of different wavelengths. In the example shown the first output pulse from doublet crystal 32, pulse 34, will have a substantial component at 0.53 micrometers for the example wherein the laser rod is Nd:YAG while the second pulse 36 will be primarily at the original wavelength of 1.06 micrometers.

In the present embodiment the beam-splitter/polarizer used is a dielectric polarizer. Other beam-splitter/polarizers typically useful in this application are Nicol prisms, calcite polarizers and Glan-Thomson polarizers.

Next to the lasing device 14 there is mounted a pumping means 38 for exciting the lasing device into a state of high population inversion, typically, a flashlamp. The pumping means 38 is electrically excited by a voltage from a power supply 40.

The Q-switches 18 and 23 are positioned within the noncommon sections of the first and second optical cavities, respectively, in order to confine the laser energy within the cavities until a sufficient population inversion is achieved within the lasing device 14. Typically Pockel cells are utilized to effect such Q-switching.

The Q-switches 18 and 23 are switched under the control of a variable time delay means 42 which is initiated by a signal from the power supply 40. However, the means for providing energy to the pumping means 38 and the particular means for controlling the Q-switches form no part of the invention as they are well-known and many different circuits may be used.

In operation the pumping means 38 receives a pulse of current from the flashlamp power supply 40 and emits a pulse of pumping radiation of the appropriate wavelength to excite the molecules in the lasing device 14. Since the lasing device 14 was chosen to exhibit thermally induced, stress-birefringence light is emitted from the lasing device 14 with two distinct planes of polarization. Light of one polarization is propogated through the beam splitter 16 so that it remains on the optical axis of the first optical cavity while light of the second polarization is reflected by the internal surface of beam splitter 16 along the optical axis of the second optical cavity.

The Q-switching devices 18 and 23 are actuated through the delay device 42 so as to put the optical cavity in a low Q or high loss condition. After a period of times has elapsed to permit the excited atoms in laser device 14 to reach a state of high population inversion the voltage applied to one of the Q-switches (e.g., Q-switch 18) is removed thus establishing in the optical cavity for the Q-switch a low loss or high Q condition. Almost simultaneously with this switching, a laser pulse is emitted from this cavity (pulse 28). Subsequent to the removal of voltage from Q-switch 18, voltage is removed from Q-switch 23 to allow pulse 26 to be emitted from the cavity.

The two pulses 28 and 30 are impressed upon doubler 32. If pulse 28 is polarized in the plane of operation of the frequency doubler 32 it will exit the doubler as pulse 34 a portion of which is at half the wave-length of when it entered the doubler. Pulse 30 on the other hand has its polarization oriented orthogonal to the active plane of the doubler crystal 32 and will exit the system as pulse 36 undoubled. Thus, two pulses are generated of different colors with variable time separation.

Also illustrated in this figure is a fresnel rhomb 43 arranged at an angle of 45° to receive the output from doubler 32. This is used to circularly polarize both pulses 34 and 36 forming pulses 44 and 46. However, this is not necessary except in applications wherein circular polarization is desired.

While the illustrated embodiment sets forth particular components of the system other functionally equivalent components could be substituted therefor. Thus, it is to be understood that the embodiment shown are illustrative only, and that many variations and modifications may be made without departing from the principles of the invention herein disclosed and defined by the appended claims.

We claim:

1. A multi-color, multi-pulse laser system, comprising:
    a pluarlity of laser cavities, each having a common section;
    a laser medium disposed in the common section of said cavities;
    means for supplying pump energy to said laser medium;
    a plurality of Q-switches disposed in the noncommon sections of said cavities;
    means for actuating said Q-switches;
    a polarizer/beam-splitter disposed at the junction of said common and noncommon section of said cavities such that the output from said laser cavities is taken at said polarizer/beam-splitter in the form of multiple pulses; and
    means for changing the wavelength of at least one of said output pulses.

2. The laser system as defined in claim 1, wherein said laser medium is a material capable of being thermally stressed so that its light emissions are birefringent.

3. The laser system as defined in claim 1, wherein said Q-switches are Pockel cells.

4. The laser system as defined in claim 1, wherein each of said laser cavities includes crossed Porro prisms as resonators therefor.

5. The laser system as defined in claim 1, wherein said wavelength changing means is a doubler crystal.

6. The laser system as defined in claim 1, wherein said polarizer/beam-splitter is a dielectric polarizer.

7. The laser system as defined in claim 1, wherein said Q-switch actuating means includes means for switching said Q-switches at precise time intervals with respect to each other so as to obtain a series of rapidly recurring laser pulses.

8. The laser system as defined in claim 1, further including means coupled to said wavelength changing means for circularly polarizing the pulses from said wavelength changing means.

* * * * *